United States Patent [19]

Iida et al.

[11] Patent Number: 4,652,108

[45] Date of Patent: Mar. 24, 1987

[54] DRIVING DEVICE FOR ILLUMINATING LAMP OF FLASH APPARATUS

[75] Inventors: Yoshikazu Iida, Chigasaki; Hisatoshi Takahata, Sakura, both of Japan

[73] Assignee: Nippon Kogaku K. K., Tokyo, Japan

[21] Appl. No.: 726,233

[22] Filed: Apr. 23, 1985

[30] Foreign Application Priority Data

Apr. 28, 1984 [JP] Japan .................................... 59-86667

[51] Int. Cl.⁴ ............................................. G03B 15/05
[52] U.S. Cl. ................................... 354/415; 354/484; 354/145.1; 354/418; 315/241 P
[58] Field of Search ............... 354/413, 415, 418, 484, 354/62, 126, 127.1, 127.11, 127.12, 132, 145.1; 355/68, 69; 315/241 P

[56] References Cited

U.S. PATENT DOCUMENTS

| | | | |
|---|---|---|---|
| 3,997,815 | 12/1976 | Decker | 354/145.1 |
| 4,067,030 | 1/1978 | Kuramoto et al. | 354/145.1 |
| 4,071,884 | 1/1978 | Maigret | 315/241 P |
| 4,141,632 | 2/1979 | Mitchell | 354/19 |
| 4,199,242 | 4/1980 | Hozomizu et al. | 354/145.1 |
| 4,354,750 | 10/1982 | Hasegawa et al. | 354/128 |
| 4,367,025 | 1/1983 | Metzger | 354/145.1 |
| 4,400,087 | 8/1983 | Nakayama | 315/241 P |

*Primary Examiner*—Russell E. Adams
*Attorney, Agent, or Firm*—Shapiro and Shapiro

[57] ABSTRACT

Driving device for illuminating lamp of flash apparatus comprises means for detecting supplied voltage supplied to the illuminating lamp and generating a detection signal corresponding to thus detected voltage, power supply means for supplying power to the illuminating lamp according to the supplied voltage, and means for controlling the period of power supply from the power supply means to the illuminating lamp according to the detection signal.

6 Claims, 10 Drawing Figures

FIG. 1
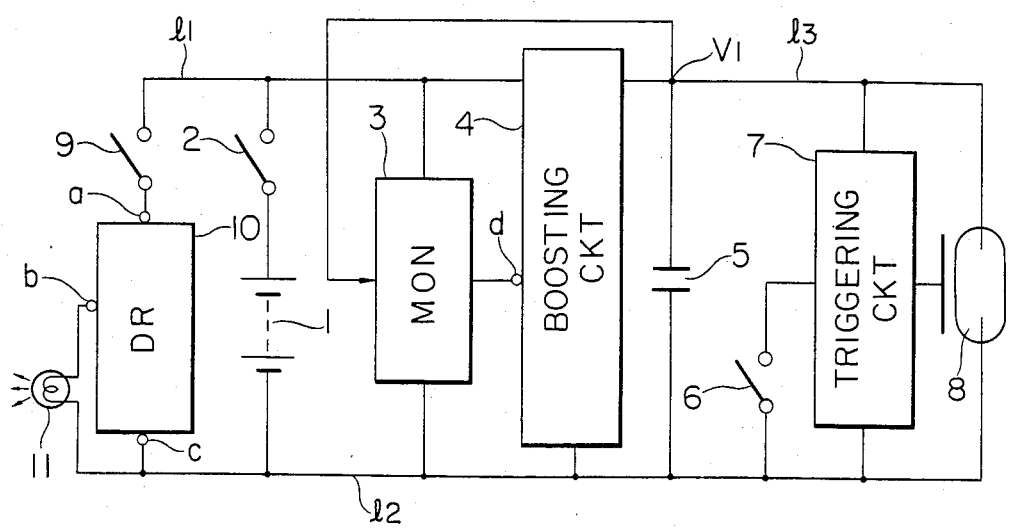
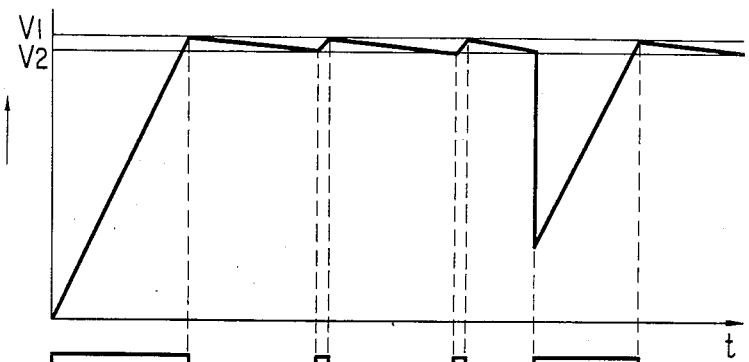
FIG. 2A
VOLTAGE OF
CONDENSER 5
FIG. 2B
FIG. 2C
VOLTAGE OF
POWER 1
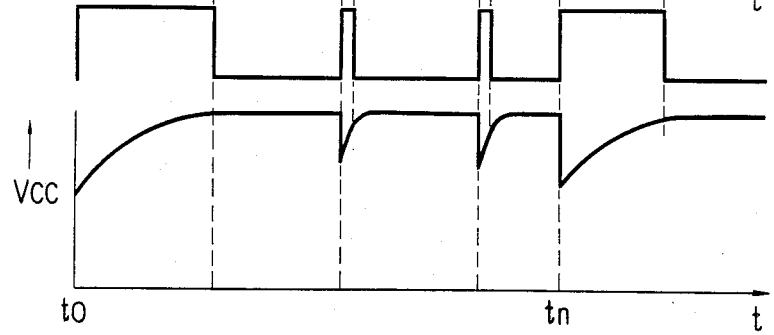

FIG. 3
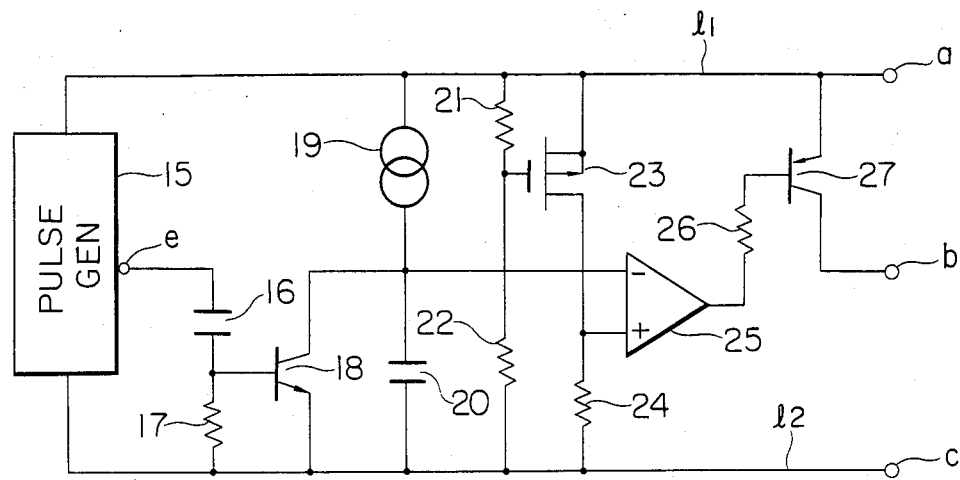
FIG. 4A
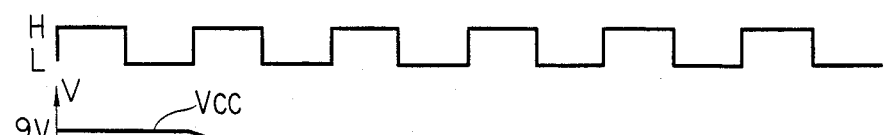
FIG. 4B
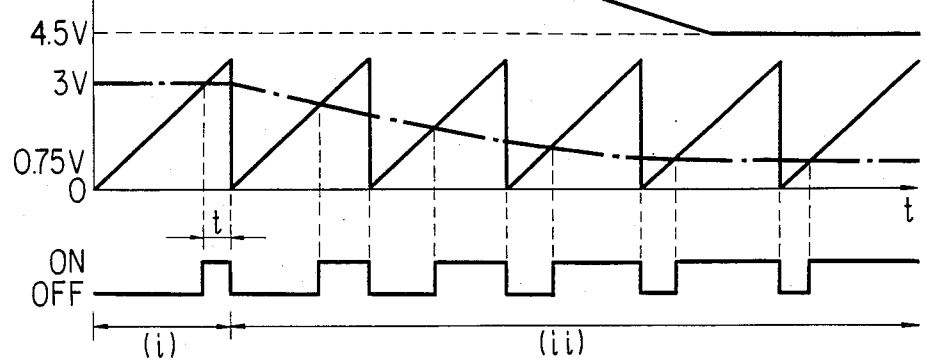
FIG. 4C

DRIVING DEVICE FOR ILLUMINATING LAMP OF FLASH APPARATUS

BACKGROUND OF THE INVENTION

1. Field of the Invention

The present invention relates to a driving device for an illuminating lamp of a flash apparatus.

2. Description of the Prior Art

There is already known a photographic flash apparatus, particularly flash apparatus for underwater photography, incorporating an illuminating device with a tungsten lamp (hereinafter called modelling light) for illuminating an object to enable proper framing or lens focusing even when the object and the surrounding are dark.

In a flash apparatus, it is well known that the voltage of the power source battery shows a drop due to the internal resistance thereof, since a large current is required at the initial period of charging the main condenser through the voltage booster circuit. Such drop of the battery voltage at the initial period of charging operation is particularly marked in a flash apparatus in which the main condenser is rapidly charged to a determined voltage higher than the dischargeable voltage of the flash tube. Consequently the modelling light composed of a tungsten lamp, if simply connected to the power source of the flash apparatus, will suffer from varying light intensity due to the fluctuation in the battery voltage.

In order to avoid such drawback there has been proposed to employ a large battery with a lower internal resistance, or to serially connect a constant-voltage circuit with the modelling light for providing the same with a constant voltage. However the former solution increases the dimension of the flash apparatus, while the latter is associated with heat generation caused by a voltage drop, since a high power source voltage is reduced to a low voltage in the flash apparatus.

SUMMARY OF THE INVENTION

The object of the present invention is to provide a driving device for an object illuminating lamp capable of providihg a stable light intensity even in the presence of a significant variation in the power source voltage.

The foregoing object is achieved according to the present invention by a device in which the power supply time to the illuminating lamp is rendered variable in response to the variation of the power source voltage.

BRIEF DESCRIPTION OF THE DRAWINGS

FIG. 1 is a block diagram of an electronic flash apparatus;

FIGS. 2A, 2B, 2C are a timing chart showing the function of said electronic flash apparatus;

FIG. 3 is a circuit diagram showing a first embodiment of the present invention;

FIGS. 4A, 4B, 4C are a timing chart showing the function of said first embodiment of the present invention;

DETAILED DESCRIPTION OF THE PREFERRED EMBODIMENTS

Figure 5:
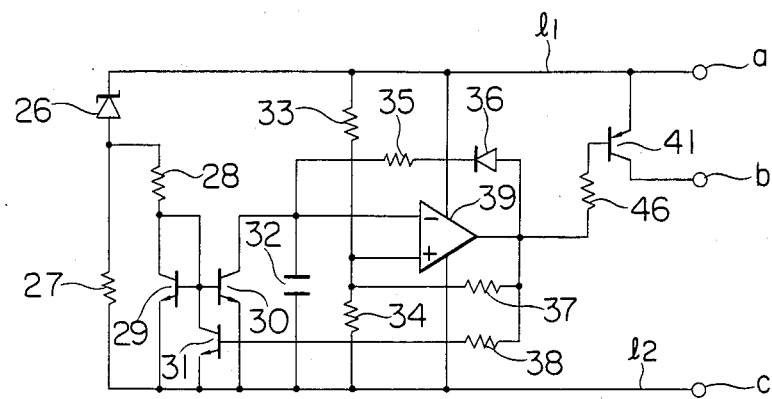
FIG. 5 is a circuit diagram showing a second embodiment of the present invention.

As shown in FIG. 1, a power source 1 and a power switch 2 are serially connected. Between a power supply line 11 connected to said power switch 2 and a ground line 12 connected to the negative pole of said power source 1, there are connected a modelling light switch 9 serially connected with a driving circuit 10; a voltage boosting circuit 4; and a monitor circuit 3 for detecting the boosted voltage from said boosting circuit 4. A main condenser 5, a trigger circuit 7 and a flash tube 8 are connected between a boosted voltage supply line 13 connected to said boosting circuit 4 and the ground line 12. Said boosting circuit 4 is composed of a DC-DC converter for example disclosed in the U.S. Pat. No. 4,354,750.

The monitor circuit 3 supplies a low (L)-level signal to the control input terminal d of the boosting circuit 4, when the main condenser 5 is charged to a first voltage level V1, to terminate the voltage boosting operation of the boosting circuit 4, and supplies a high (H)-level signal to said terminal d to initiate the voltage boosting operation of the boosting circuit 4 when the charges voltage of the main condenser 5 becomes equal to or lower than a second voltage level V2 which is slightly lower than said first voltage level V1. By closing the switch 9, the driving circuit 10 is energized to light a modelling light 11.

Now reference is made to FIG. 2 for explaining the function of the circuit shown in FIG. 1. FIG. 2A shows the change in the charged voltage of the main condenser 5, FIG. 2B shows the output signals of the monitor circuit 3, and FIG. 2C shows the change in the power source voltage.

In response to the closing of the power switch 2, the boosting circuit 4 starts the voltage boosting operation whereby the main condenser 5 is rapidly charged. When the charged voltage therein reaches the first voltage level V1, the signal supplied from the monitor circuit 3 to the control input terminal d of the boosting circuit 4 is shifted from H-level to L-level, whereby the boosting circuit 4 terminates the voltage boosting operation.

The charged voltage of the main condenser 5 thereafter shows a gradual decrease for example due to a leak current in said condenser 5, and, when said voltage reaches the second voltage level V2, the monitor circuit 3 supplies an H-level signal to the control input terminal d of the boosting circuit 4, thereby re-starting the voltage boosting operation. The above-explained functions are repeated until the trigger switch 6 is closed.

If the trigger switch 6 is closed at a time tn as shown in FIG. 2A, the trigger circuit 7 is activated to induce a flash discharge in the flash tube 8, whereby the charged voltage of the main condenser 5 drops rapidly to a lowest voltage for maintaining the discharge in the flash tube 8. After the termination of the flash discharge, the main condenser 5 is charged again to the first voltage level V1 by the boosting circuit 4.

For example, when a main condenser 5 of 2,000 $\mu$F and six UM-2 alkali-manganese batteries are employed in combination with a boosting circuit capable of charging said condenser 5 to the first voltage level V1 within 10 seconds, a large current in excess of 5 amperes is extracted from the power source battery 1, whereby the terminal voltage thereof drops, due to the internal resistance thereof, to about 4.5 V which is about a half of the terminal voltage while the boosting circuit 4 is not in function, as shown in FIG. 2C.

Now reference is made to FIGS. 3 and 4 for giving more details on the driving circuit 10 shown in FIG. 1. FIG. 3 is a circuit diagram of said driving circuit 10, and FIG. 4D is a wave form chart showing the output signal form of a pulse generator 15 of said circuit 10, FIG. 4E shows the change in input voltage to a comparator 25 when the power source voltage drops, and FIG. 4F shows power supply intervals to terminals b, c of the driving circuit 10. Between a power source line 11 connected to a terminal a and a ground line 12 connected to a terminal c, there are connected a pulse generator 15, a constant current source 19 serially connected with a condenser 20, a resistor 21, serially connected with a resistor 22, and a field effect transistor 23 composed in the present embodiment of a p-channel MOS FET and serially connected with a resistor 24. The constant current source 19 has an output current capable of elevating the terminal voltage of the condenser 20 by 3 V within 0.8 ms, and the pulse generator 15 generates pulses of a frequency of 1 KHz with a duty ratio of 50%. The tungsten lamp used as the modelling light 11 is connected between the terminals b and c.

Between an output terminal e of the pulse generator 15 and the ground line 12 there are serially connected a condenser 16 and a resistor 17, and the junction point therebetween is connected to the base of a transistor 18, which is connected parallel to a condenser 20. The inverting input terminal of a comparator 25 is connected to the junction point between the constant current source 19 and the condenser 20, and the non-inverting input terminal is connected to the junction point between the field effect transistor 23 and the resistor 24. The output terminal of said comparator 25 is connected, through a resistor 26, to the base of a transistor 27, of which emitter and collector are respectively connected to the terminals a and b. The gate-source voltage of the field effect transistor 23 is regulated, by means of the resistors 21, 22, to ⅓ of the voltage Vcc of the power source 1. Also the resistor 24 is so selected that the voltage of the non-inverting input terminal of the comparator 25 becomes equal to 3 V by the drain current of the field effect transistor 25 when the power source voltage Vcc is equal to 9 V.

Now reference is made to FIG. 4 for explaining the function of the circuit shown in FIG. 3. When the switch 9 is closed to energize the driving circuit 10, the pulse generator 15 releases pulse signals of 1 KHz as shown in FIG. 4D. When the power source voltage Vcc is sufficiently high (9 V), the non-inverting input terminal of the comparator 25 receives a voltage of 3 V as represented by a chain line, in a period (i), in FIG. 4E. However, when said power source voltage Vcc becomes lower, said input voltage shows a decrease along a second-order function as shown in a period (ii). In response to the leading edge of each pulse from the pulse generator 15, the transistor 18 is momentarily turned on and then off whereby the condenser 20 is discharged to reduce the potential of the inverting input terminal of the comparator 25 to zero. When said transistor is turned off, the condenser 20 is charged by the constant current source 19, whereby the voltage of the inverting input terminal of the comparator 25 linearly rises from zero, thus showing a saw-tooth change shown in FIG. 4E. It is noted that the transistor turning on shows its conductive state and its turning off shows its non-conductive state.

The driving circuit 10 functions in the following manner when the power source voltage Vcc is sufficiently high (9 V). As shown in the period (i) in FIG. 4 (only one cycle being shown for simplicity), a voltage is supplied across the terminals a and c in response to the closing of the switch 9, whereby the pulse generator 15 releases pulse signals of 1 KHz and the voltage at the inverting input terminal of the comparator 25 shows a linear increase from zero, starting at the leading edge of each pulse. The voltage at the inverting input terminal becomes higher than that at the non-inverting input terminal after about 0.8 ms from the leading edge of each pulse, whereby the output signal of the comparator 25 is shifted from high level to low level, thus turning on the transistor 27 and applying a voltage across the terminals b and c. The modelling light 11 is activated in response to the voltage supply across said terminals b and c, as shown in FIG. 4F. However, after a cycle (after 1 ms) from the start of the H-level signal, the transistor 18 is turned on as explained above to reduce the voltage of the inverting input terminal of the comparator 25 to zero, whereby the comparator 25 releases an H-level signal to terminate the power supply to the modelling light 11. Consequently, when the power source voltage Vcc is sufficiently high, the power supply to the modelling light 11 is conducted with pulse signals of a duty ratio of ca. 20% as shown in FIG. 4F. The modelling light 11, being composed of a tungsten lamp, does not show a change in the light intensity if the power supply is effected with pulse signals of 1 KHz with a duty ratio of ca. 20%.

In the following there will be explained the function of the driving circuit 10 when the power source voltage Vcc is reduced from 9 V to 4.5 V. As explained in the following, the driving circuit 10 maintains a same power supplied to the modelling light 11 even in such case. The gate-source voltage of the MOS field effect transistor 23 is equal to 3 V when the power source voltage is 9 V, and the drain-source voltage is equal to 6 V in such case. The field effect transistor 23 has such characteristic that the rate of change of the drain-source current is proportional to the square of the rate of change of the gate-source voltage. Thus, as shown in the period (ii) in FIG. 4, when the power source voltage Vcc changes from 9 V to a half value 4.5 V, the terminal voltage of the resistor 24 or the voltage at the non-inverting input terminal of the comparator 25 varies proportional to the square of the rate of change of the power source voltage Vcc. Consequently, since the voltage at the non-inverting input terminal of the comparator 25 is equal to 3 V when the power source voltage Vcc is 9 V, the former input voltage becomes equal to 0.75 V which is equal to ¼ of 3 V, when the power source voltage Vcc is reduced to 4.5 V. Thus, when the power source voltage Vcc is reduced from 9 V to 4.5 V, the period t of power supply to the modelling light 11 is extended proportionally to the square of the rate of change of the power source voltage Vcc as shown in the period (ii) in FIG. 4F. Stated differently, in response to a decrease in the power source voltage Vcc, the voltage at the non-inverting input terminal of the comparator 25 shows a second-order change to extend the power supply period t of the driving circuit 10 to the modelling light 11.

The transistor 27 of the driving circuit 10 is rendered conductive during the power supply period t to the modelling light 11, whereby the terminals a, b receive a voltage substantially equal to the power source voltage Vcc. The ratio D of power supply period to the modelling light 11 by the activation of the transistor 27 within a cycle of the pulse generator 15, being designed to increase proportionally to the square of the rate of change of the power source voltage Vcc as shown in the period (ii) in FIG. 4F, is represented by:

$$D = K1 \cdot (1/(V11/V0))^2 \quad (1)$$
$$= K1 \cdot (V0/V11)^2$$

wherein V11/V0 indicates the power source voltage Vcc in which V0 is the maximum voltage of the power source 1 and V11 is the voltage supplied to the modelling light 11, and K1 is a constant.

Also the power P supplied to the modelling light 11 within a unit time is represented by:

$$P = V11^2/K2 \quad (2)$$

wherein K2 is a constant.

Consequently, the average power supply P1

$$P1 = D \cdot P \quad (3)$$
$$= K1 \cdot (V0/V11)^2 \cdot V11^2/K2$$
$$= K1 \cdot V0^2/K2$$

Consequently, the average power supply to the modelling light 11 is maintained constant regardless of the change in the power source voltage Vcc, and the light intensity of said modelling light 11 remains also constant.

As explained in the foregoing, the according to the present invention, detecting means composed of the resistors 21, 22, 24, field effect transistor 23, constant current source 19 and condenser 20 detects the change in the power source voltage Vcc, and the comparator 25 accordingly controls the transistor 27 regulating the power supply period to the modelling light 11, thus varying the duty ratio of power supply time thereto. More specifically, in response to a decrease in the power source voltage Vcc, the detecting means extends the power supply period to the modelling light 11, inversely proportional to the square of rate of change of said power source voltage Vcc, thus achieving a substantially constant average power supply by the change in the duty ratio. The terminal loss is maintained very small since the power supply to the modelling light 11 is achieved only by the switching operation of the transistor 27.

Figure 6:
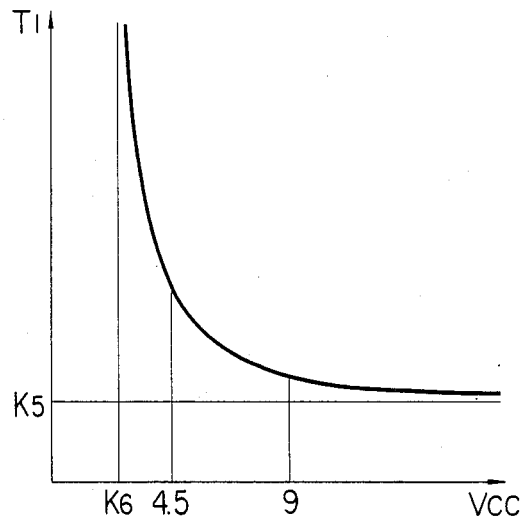
FIG. 6 is a timing chart showing the function of said second embodiment of the present invention.

FIGS. 5 and 6 show a second embodiment of the present invention, wherein FIG. 5 is a circuit diagram of a driving circuit 10 and FIG. 6 is a chart showing the relationship between the power supply period to the modelling light and the power source voltage. Between a power source line 11 and a ground line 12 there are connected a Zenar diode 26 serially connected with a resistor 27, and a resistor 33 serially connected with a resistor 34. A resistor 28 serially connected with the collector and emitter of a transistor 29 is connected parallel to said resistor 27. The base of said transistor 29 is connected to the base of a transistor 30, of which the collector is connected to the inverting input terminal of a comparator 39 and the emitter is connected to the ground line 12. The junction point between the resistor 28 and the collector of the transistor 29 is connected to the junction point between the base of the transistor 29 and the base of the transistor 30, and said latter junction point is further connected to the collector of a transistor 31, of which emitter is connected to the ground line 12 and the base is connected through a resistor 38 to the output terminal of the comparator 39. A condenser 32 is connected across the collector and emitter of the transistor 30. The non-inverting input terminal of the comparator 39 is connected to the junction point between the resistors 33 and 34. The output terminal of the comparator 39 is connected through a resistor 46 to the base of a transistor 41, of which emitter and collector are respectively connected to terminal a, b. The comparator 39 receives a negative feedback from serially connected resistor 35 and diode 36.

The transistors 29, 30 constitute a current Miller circuit, whereby collector current of the transistor 30 connected to the inverting input terminal of the comparator 39 is equal to the current in the resistor 28 when the transistor 31 is turned off. The condenser 32 is charged through a serial circuit of the resistor 35 and the diode 36 when the comparator 39 releases a high (H)-level signal, and is discharged through the transistor 30 when the comparator 39 releases a low (L)-level signal. The potential of the output signal from the comparator 39 is equal to that of the line 11 or 12 respectively at the high (H)-level or low (L)-level state.

The second embodiment functions in the following manner.

In response to the closing of the switch 9, a voltage is supplied across the terminals a and c. If the terminal voltage of the condenser 32 is zero in this state, the comparator 39 releases an H-level signal, whereby the transistor 41 is turned off and the modelling light 11 does not receive power supply.

On the other hand, the transistor 31 is turned on, whereby the transistor 30 shows no collector current and the condenser 32 is charged through the serial circuit of resistor 35 and diode 36.

When the comparator 39 releases an H-level output signal, the potential at the non-inverting input terminal thereof is equal to a voltage, hereinafter called V21, obtained by dividing the terminal voltage of the power source 1 with the parallel resistors 33, 37 and the resistor 34. When the condenser 32 is charged to provide said voltage V21 to the inverting input terminal, the comparator 39 shifts the output signal from the H-level to L-level, whereby the transistor 41 is turned on to feed the power to the modelling light 11 and to turn off the transistor 31. In response the condenser 32 is discharged through the transistor 30.

When the comparator 39 releases an L-level output signal, the potential at the non-inverting input terminal thereof is equal to the voltage, hereinafter called V22, obtained by dividing the terminal voltage of the power source 1 with the resistor 33 and the parallel resistors 34, 37. In such state the transistor 31 is turned off while the transistors 29, 30 are turned on, whereby the condenser 32 is discharged through the transistor 30. When the potential of the inverting input terminal of the comparator 39 is reduced to the voltage V21, the comparator 39 again releases an H-level signal to turn off the transistor 41. In response the power supply to the modelling light 11 is terminated, and the condenser 32 is no longer discharged through the transistor 30 but is charged through the serial circuit of resistor 35 and diode 36.

In this manner the power supply to the modelling light 11 is intermittently repeated.

In the following there will be explained the periods of power supply and of interruption of power supply to the modelling light 11. In the following R1, R2, R3, R4 and R5 stand respectively for resistances of the resistors 35, 33, 34, 37 and 28; $V_D$ for the forward voltage of the diode 36; $V_{BE}$ for the base-emitter voltage of the transistor 29; Vz for the Zenar voltage of the Zenar diode 26; C for the capacitance of the condenser 32; and Vcc for the terminal voltage of the power source 1. The voltages V21, V22 are represented by:

$$V21 = Vcc \times \frac{R3}{R2//R4 + R3} \quad (4)$$

$$V22 = Vcc \times \frac{R3//R4}{R2 + R3//R4} \quad (5)$$

wherein R2//R4 is equal to R2R4/(R2+R4), and R3//R4 is equal to R3R4/(R3+R4).

Also the collector current IC of the transistor 30 when the transistor 31 is turned off is represented $$IC = \frac{Vcc - V_{BE} - Vz}{R5} \quad (6)$$

The period T1 of power supply to the modelling light 11, and the period T2 of absence of power supply to the modelling light 11, obtained by the on-off function of the transistor 41, are therefore calculated as follows:

$$T1 = (V21 - V22) \times C \times \frac{1}{IC} \quad (7)$$

$$= \left( \frac{R3}{R2//R4 + R3} - \frac{R3//R4}{R2 + R3//R4} \right) \times C \times R5 \times$$

$$\left( \frac{1}{1 - \frac{V_{BE} + Vz}{Vcc}} \right)$$

$$= K5 \times \left( 1 / \left( 1 - \frac{K6}{Vcc} \right) \right)$$

wherein K5 and K6 are constants.

$$T2 = CR1 \ln \left( \frac{1}{1 - \frac{V21}{Vcc - V_D}} \right) - CR1 \ln \left( \frac{1}{1 - \frac{V22}{Vcc - V_D}} \right) \quad (8)$$

$$= CR1 \ln \left\{ \frac{1 - \left( \frac{Vcc}{Vcc - V_D} \right) \left( \frac{R3//R4}{R2 + R3//R4} \right)}{1 - \left( \frac{Vcc}{Vcc - V_D} \right) \left( \frac{R3}{R2//R4 + R3} \right)} \right\}$$

When the Vcc changes in a range from 9 V to 4.5 V as in the first embodiment:

$$T2 \approx CR \ln \left\{ \frac{1 - \left( \frac{R3//R4}{R2 + R3//R4} \right)}{1 - \left( \frac{R3}{R2//R4 + R3} \right)} \right\} \quad (9)$$

The period T2 is substantially constant regardless of the power source voltage Vcc, as the equation (9) no longer contains the variable Vcc.

On the other hand, the power supply period T1 is a hyperbolic function, as will be understood from the equation (7), for parameters $V_{BE}$=Ca. 0.6 V and Vz=Ca. 3.8 V. Thus the period T1 increases as shown in FIG. 6 as the power source voltage Vcc decreases from 9 V to 4.5 V. If the values of R1-R5 and C are so selected that the periods T1 and T2 are respectively equal to 0.2 ms and 0.8 ms for a sufficiently high power source voltage (Vcc=9 V), the duty ratio increases approximately inverse-proportionally to the square of the rate of change of the terminal voltage Vcc in responce to the decrease of said voltage Vcc of the power source 1 as in the first embodiment. Consequently, the power supplied to the modelling light 11 remains substantially constant regardless of the change in the voltage of the power source 1 as in the first embodiment.

We claim:

1. A device provided in an electronic flash apparatus and provided with means for illuminating an object prior to the flash emission to said object and capable of controlling the illumination to said object by means of a voltage supplied to said illuminating means, comprising:
    (a) means for detecting said supplied voltage and generating a detection signal according to the detected voltage;
    (b) power supply means for supplying power to said illuminating means according to said supplied voltage; and
    (c) control means for controlling the period of power supply from said power supply means to said illuminating means according to said detection signal, said control means being adapted to control said power supply means in such a manner that average power supplied to said illuminating means per unit period is substantially constant.

2. A device provided in an electronic flash apparatus and provided with means for illuminating an object prior to the flash emission to said object and capable of controlling the illumination to said object by means of a voltage supplied to said illuminating means, comprising:
    (a) means for detecting said supplied voltage and generating a detection signal according to the detected voltage;
    (b) power supply means for supplying power to said illuminating means according to said supplied voltage; and
    (c) control means for controlling the period of power supply from said power supply means to said illuminating means according to said detection signal, said control means being adapted to supply said power supply means with a control signal for controlling said power supply period.

3. A device according to claim 2, wherein said control means is adapted to control said power supply means in such a manner that said period of power supply is extended in response to a decrease in said supplied voltage.

4. A device according to claim 2, wherein said power supply means comprises means for supplying said illuminating means with said supplied voltage in response to said control signal.

5. A device provided in an electronic flash apparatus and provided with means for illuminating an object prior to the flash emission to said object and capable of controlling the illumination to said object by means of a voltage supplied to said illuminating means, comprising:
   (a) means for detecting said supplied voltage and generating a detection signal according to the detected voltage;
   (b) power supply means for supplying power to said illuminating means according to said supplied voltage; and
   (c) control means for controlling the period of power supply from said power supply means to said illuminating means according to said detection signal, said control means being adapted to control said power supply period in such a manner tht, in response to a decrease in said supplied voltage, said power supply period is inversely proportional to the square of the ration of said supplied voltage after said decrease to said supplied voltage prior to decrease.

6. A device with means for illuminating an object, comprising:
   (a) means for supplying a voltage;
   (b) means for detecting the voltage supplied by said supply means and generating a detection signal corresponding to the detected voltage; and
   (c) power supply means for supplying power to said illuminating means according to the voltage supplied by said supply means, said power supply means comprising control means for controlling the power supply period to said illuminating means in response to said detection signal, said control means being adapted to control said power supply period in such a manner that the average power supplied to said illuminating means is substantially constant.

* * * * *